US011996000B2

United States Patent
Hong et al.

(10) Patent No.: US 11,996,000 B2
(45) Date of Patent: May 28, 2024

(54) APPARATUS AND METHOD FOR INSPECTING NAVIGATION SAFETY FACILITIES BY USING FLIGHT VEHICLE

(71) Applicant: KOREA AIRPORTS CORPORATION, Seoul (KR)

(72) Inventors: Jin Young Hong, Seoul (KR); Gyu Jin Son, Bucheon-Si (KR); Hyun Bae Yang, Bucheon-Si (KR); Byong Kwang Kim, Goyang-Si (KR); Woo Ram Son, Seoul (KR); Su In Sim, Incheon (KR)

(73) Assignee: KOREA AIRPORTS CORPORATION, Seoul (KR)

( * ) Notice: Subject to any disclaimer, the term of this patent is extended or adjusted under 35 U.S.C. 154(b) by 511 days.

(21) Appl. No.: 17/271,976

(22) PCT Filed: Nov. 20, 2018

(86) PCT No.: PCT/KR2018/013880
§ 371 (c)(1),
(2) Date: Feb. 26, 2021

(87) PCT Pub. No.: WO2020/045744
PCT Pub. Date: Mar. 5, 2020

(65) Prior Publication Data
US 2021/0343153 A1  Nov. 4, 2021

(30) Foreign Application Priority Data
Aug. 30, 2018 (KR) .................. 10-2018-0102835

(51) Int. Cl.
*B64D 43/00* (2006.01)
*G08G 5/00* (2006.01)

(52) U.S. Cl.
CPC .............. *G08G 5/006* (2013.01); *B64D 43/00* (2013.01); *G08G 5/0013* (2013.01); *G08G 5/0034* (2013.01)

(58) Field of Classification Search
CPC .... G08G 5/006; G08G 5/0013; G08G 5/0034; G08G 5/0026; G08G 5/0082;
(Continued)

(56) References Cited

U.S. PATENT DOCUMENTS

2016/0370468 A1  12/2016  Son
2019/0077506 A1*  3/2019  Shaw .................. G06F 21/00

FOREIGN PATENT DOCUMENTS

CA       3015779 A1 *  3/2019 ............. A01G 23/00
CN     106796112 B  * 10/2015
(Continued)

OTHER PUBLICATIONS

PCT, "International Search Report & Written Opinion," App. No. PCT/KR2018/013880, dated May 30, 2019, 10 pages.

*Primary Examiner* — Adam R Mott
*Assistant Examiner* — Heather J Keniry
(74) *Attorney, Agent, or Firm* — Studebaker & Brackett PC

(57) ABSTRACT

An apparatus and a method for inspecting navigation safety facilities by using a flight vehicle are disclosed. The method for inspecting navigation safety facilities by using a flight vehicle comprises the steps of: defining a three-dimensional flight path for a flight vehicle so that same passes through navigational safety facilities; receiving a navigation signal value from the navigation safety facilities and GPS data of the flight vehicle, the navigation signal value and the GPS data being measured by the flight vehicle automatically flying along the defined three-dimensional flight path; analyzing the navigation signal value so as to estimate the
(Continued)

distance and the angle of the flight vehicle viewed from the navigation safety facilities; and inspecting the navigation safety facilities according to whether the coordinates of the flight vehicle identified by the GPS data are included in an area formed by the distance and the angle.

12 Claims, 15 Drawing Sheets

(58) Field of Classification Search
CPC .. G08G 5/0069; G08G 5/0073; G08G 5/0017; B64D 43/00; B64U 2101/00
See application file for complete search history.

(56) References Cited

FOREIGN PATENT DOCUMENTS

| | | | |
|---|---|---|---|
| KR | 101504694 | B1 * | 10/2013 |
| KR | 20140082325 | A | 7/2014 |
| KR | 101504694 | B1 | 3/2015 |
| KR | 20180075617 | A * | 11/2016 |
| KR | 101718287 | B1 | 4/2017 |
| KR | 101824707 | B1 * | 6/2017 |
| KR | 101793509 | B1 | 11/2017 |
| KR | 101824707 | B1 | 2/2018 |
| KR | 101827351 | B1 | 2/2018 |
| KR | 101846318 | B1 | 5/2018 |
| KR | 20180075617 | A | 7/2018 |

* cited by examiner

| Navigation safety facility | Navigation signal value |
|---|---|
| ILS | AM 90Hz/150Hz depth, DDM(Sum, Course, Clearance), SDM(Sum, Course, Cleatance), CDI, Received power(Sum, Course, Clearance), Frequency, etc. |
| Radar | Received power, Pulse width, PRF, Frequency, etc. |
| VOR | AM 30Hz/9960Hz depth, FM Index, Bearing, Bearing Error, Received power, Frequency, etc. |
| TACAN | AM 15Hz/135Hz depth, Pulse width, Squitter number, Bearing, Bearing Error, Received power, Frequency, etc. |
| DME | Pulse width, Squitter number, Delayed time, Distance, Received power, Frequency, etc. |
| A/G | AM depth, Pulse waveform, Received power, Frequency, etc. |

FIG. 3

<Flight based on level run at each altitude>

<Flight based on distance at each altitude>

<DDM value for each landing angle of ILS (glide path)>

<AM 30Hz depth value for each altitude of VOR system>

APPARATUS AND METHOD FOR INSPECTING NAVIGATION SAFETY FACILITIES BY USING FLIGHT VEHICLE

TECHNICAL FIELD

Example embodiments relate to an apparatus and method for inspecting a navigation safety facility using a flight vehicle.

BACKGROUND ART

A flight vehicle receives information of a navigation safety facility until it lands after it takes off, and flies based on the received information.

Thus, a periodic inspection of the navigation safety facility may be required for the safety of the flight vehicle, ensuring that the navigation safety facility operates normally without an error.

A typical inspection of a navigation safety facility may be conducted by a flight vehicle dedicated to inspections, and the vehicle may make a flight with a landing angle maintained or make a one-dimensional (1D) flight such as a circumference flight with the same height and distance maintained.

However, such a 1D flight may have its limitation that restricts an inspection of normality of a navigation safety facility in various cases of numerous flight vehicles flying in a three-dimensional (3D) space.

DISCLOSURE OF INVENTION

Technical Solutions

An aspect provides an apparatus and method that periodically receives, from a flight vehicle automatically flying along a three-dimensional (3D) flight path defined to pass through a navigation safety facility, a navigation signal value measured from the navigation safety facility by the flight vehicle and global positioning system (GPS) data of the flight vehicle, and inspects the navigation safety facility based on the received navigation signal value and GPS data, thereby enabling a more accurate inspection of the navigation safety facility.

According to an example embodiment, there is provided an apparatus for inspecting a navigation safety facility using a flight vehicle, the apparatus including a controller configured to define a 3D flight path for the flight vehicle such that it passes through the navigation safety facility, an interface configured to receive a navigation signal value of the navigation safety facility measured by the flight vehicle automatically flying along the defined 3D flight path, and GPS data of the flight vehicle, an estimator configured to estimate a distance and an angle of the flight vehicle viewed from the navigation safety facility by analyzing the navigation signal value, and a processor configured to inspect the navigation safety facility based on whether coordinates of the flight vehicle identified by the GPS data are included in an area formed by the distance and the angle.

According to another example embodiment, there is provided a method of inspecting a navigation safety facility using a flight vehicle, the method including defining a 3D flight path for the flight vehicle such that it passes through the navigation safety facility, receiving a navigation signal value of the navigation safety facility measured by the flight vehicle automatically flying along the defined 3D flight path, and GPS data of the flight vehicle, estimating a distance and an angle of the flight vehicle viewed from the navigation safety facility by analyzing the navigation signal value, and inspecting the navigation safety facility based on whether coordinates of the flight vehicle identified by the GPS data are included in an area formed by the distance and the angle.

Advantageous Effects

According to an example embodiment described herein, a more accurate inspection of a navigation safety facility may be enabled by periodically receiving, from a flight vehicle automatically flying along a three-dimensional (3D) flight path defined to pass through the navigation safety facility, a navigation signal value measured by the flight vehicle from the navigation safety facility and global positioning system (GPS) data of the flight vehicle, and by inspecting the navigation safety facility based on the received navigation signal value and GPS data.

BRIEF DESCRIPTION OF DRAWINGS

FIG. 3 is a diagram illustrating an example of a navigation signal value from a navigation safety facility that is received from a flight vehicle by an apparatus for inspecting the navigation safety facility using the flight vehicle according to an example embodiment.

BEST MODE FOR CARRYING OUT THE INVENTION

Figure 1:
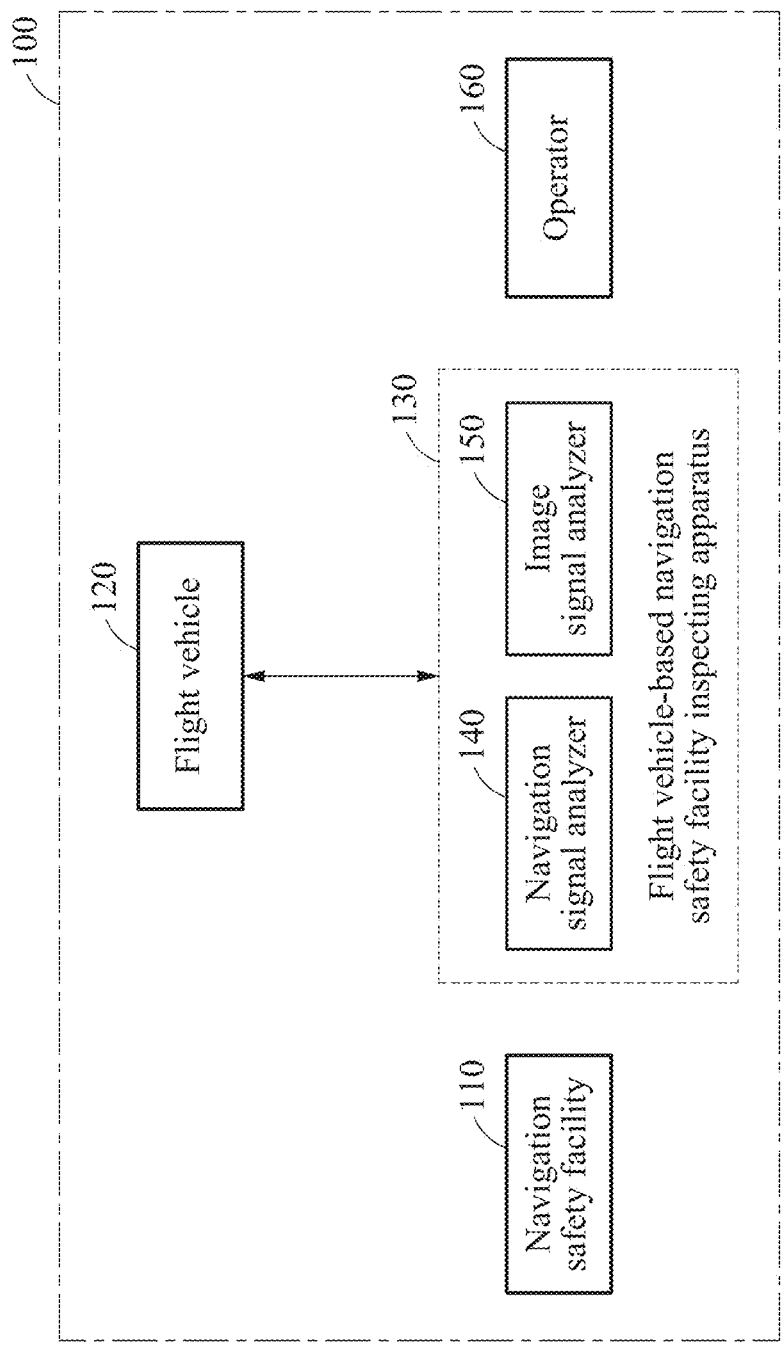
FIG. 1 is a diagram illustrating an example of a network including an apparatus for inspecting a navigation safety facility using a flight vehicle according to an example embodiment.

Hereinafter, some examples will be described in detail with reference to the accompanying drawings. However, various alterations and modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Also, when describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

Hereinafter, examples will be described in detail with reference to the accompanying drawings, and like reference numerals in the drawings refer to like elements throughout.

FIG. 1 is a diagram illustrating an example of a network including an apparatus for inspecting a navigation safety facility using a flight vehicle according to an example embodiment. Hereinafter, an apparatus for inspecting a navigation safety facility using a flight vehicle will be simply referred to as a flight vehicle-based navigation safety facility inspecting apparatus.

Referring to FIG. 1, a network 100 includes a navigation safety facility 110, a flight vehicle 120, a flight vehicle-based navigation safety facility inspecting apparatus 130, and an operator 160.

The navigation safety facility 110 may include, for example, at least one device among an instrument landing system (ILS), a radio detection and ranging (radar) system, a very-high-frequency omni-directional range (VOR) system, a tactical air navigation (TACAN) system, a distance measuring equipment (DME), and an aeronautical control communication system (e.g., an air/ground (A/G) communication system), and may generate a navigation signal value of a different type for each device.

The flight vehicle 120 may be, for example, a drone, and configured to receive a three-dimensional (3D) flight path that passes through the navigation safety facility 110 from the flight vehicle-based navigation safety facility inspecting apparatus 130 and automatically fly along the 3D flight path.

During such an automatic flight, the flight vehicle 120 may periodically measure a navigation signal value from the navigation safety facility 110 through a navigation signal measurer provided therein, and measure a navigation signal value of a different type for each device included in the navigation safety facility 110.

In addition, the flight vehicle 120 may periodically obtain global positioning system (GPS) data through a GPS module provided therein, and obtain a flight image through an image sensor.

The flight vehicle 120 may provide the navigation signal value, the GPS data, and the flight image to the flight vehicle-based navigation safety facility inspecting apparatus 130 in real time.

The flight vehicle-based navigation safety facility inspecting apparatus 130 may generate the 3D flight path that passes through the navigation safety facility 110 and provide the generated 3D flight path to the flight vehicle 120, thereby allowing the flight vehicle 120 to automatically fly along the 3D flight path.

Subsequently, the flight vehicle-based navigation safety facility inspecting apparatus 130 may periodically receive the navigation signal value generated from the navigation safety facility 110, the GPS data of the flight vehicle 120, and the flight image, from the flight vehicle 120 that automatically flies.

The flight vehicle-based navigation safety facility inspecting apparatus 130 includes a navigation signal analyzer 140 configured to analyze the navigation signal value from the navigation safety facility 110, and an image signal analyzer 150 configured to analyze the flight image.

The flight vehicle-based navigation safety facility inspecting apparatus 130 may inspect the navigation safety facility 110 based on a result from the navigation signal analyzer 140, a result from the image signal analyzer 150, and the received GPS data. For example, the flight vehicle-based navigation safety facility inspecting apparatus 130 may estimate a distance and angle of the flight vehicle 120 viewed from the navigation safety facility 110. Here, when coordinates of the flight vehicle 120 identified by the GPS data are not included in an area formed by the estimated distance and angle, the flight vehicle-based navigation safety facility inspecting apparatus 130 may determine the navigation safety facility 110 to be abnormal.

The operator 160 may directly control the flight vehicle 120. However, when the flight vehicle 120 performs an automatic flight along the 3D flight path provided by the flight vehicle-based navigation safety facility inspecting apparatus 130, the control over the flight vehicle 120 may be restricted.

However, in a case in which the navigation safety facility 110 is determined to be abnormal by the flight vehicle-based navigation safety facility inspecting apparatus 130, or an inspection on the navigation safety facility 110 is completed, the operator 160 may directly control the flight vehicle 120 to adjust a flight path, a landing point, a landing time, and the like.

Figure 2:
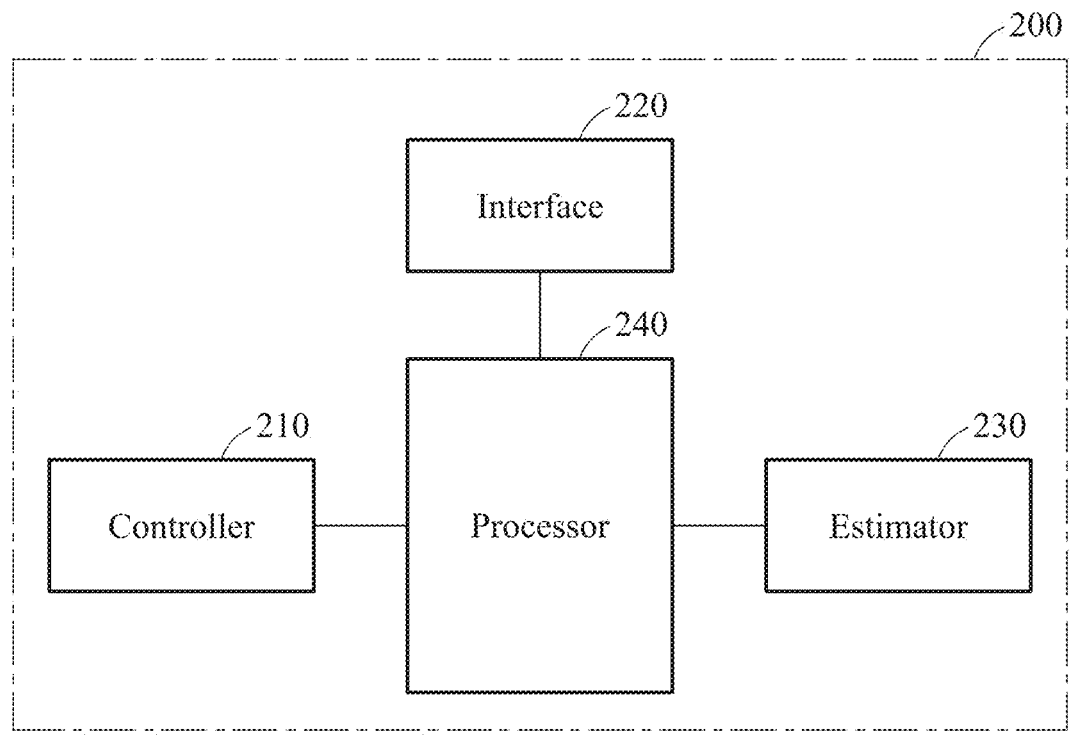
FIG. 2 is a diagram illustrating an example of a configuration of an apparatus for inspecting a navigation safety facility using a flight vehicle according to an example embodiment.

FIG. 2 is a diagram illustrating an example of a configuration of a flight vehicle-based navigation safety facility inspecting apparatus according to an example embodiment.

Referring to FIG. 2, a flight vehicle-based navigation safety facility inspecting apparatus 200 includes a controller 210, an interface 220, an estimator 230, and a processor 240.

The controller 210 may define a 3D flight path for a flight vehicle such that it passes through a navigation safety facility. In detail, the controller 210 may generate an inspection path including latitude, longitude, and altitude values based on a central point of the navigation safety facility and a position of a runway, and define the generated inspection path as the 3D flight path and provide the defined 3D flight path to the flight vehicle, thereby allowing the flight vehicle to automatically fly along the 3D flight path.

When generating the inspection path, the controller 210 may generate the inspection path based on at least one of a landing angle, an altitude, a horizontal angle, or a flight distance of the flight vehicle.

The navigation safety facility may include at least one device among an ILS, a radar system, a VOR system, a TACAN system, a DME, and an aeronautical control communication system (e.g., an A/G communication system).

The interface 220 may receive a navigation signal value measured from the navigation safety facility by the flight vehicle automatically flying along the defined 3D flight path, and GPS data of the flight vehicle. A navigation signal measurer provided in the flight vehicle may measure a navigation signal value of a different type for each device included in the navigation safety facility.

The interface 220 may verify a type of the navigation safety facility which is a target to be inspected, and selectively receive a navigation signal value that is set based on the verified type of the navigation safety facility.

The estimator 230 may analyze the navigation signal value, and estimate a distance and angle of the flight vehicle viewed from the navigation safety facility.

The processor 240 may inspect the navigation safety facility based on whether coordinates of the flight vehicle identified by the GPS data are included in an area formed by the estimated distance and angle.

In detail, the processor 240 may calculate a standard distance and a standard angle between the flight vehicle and the navigation safety facility based on the GPS data and position data of the navigation safety facility, and inspect the navigation safety facility based on whether the estimated distance and angle are within the calculated standard distance and angle, and a set allowable range. Here, when at least one of the distance or the angle is out of the standard distance or angle, and the allowable range, the processor 240 may determine the navigation safety facility to be abnormal and output a message on such an abnormality. In contrast, when at least one of the distance or the angle is not out of the standard distance or angle and the allowable range, the processor 240 may determine the navigation safety facility to be abnormal.

FIG. 3 is a diagram illustrating an example of a navigation signal value from a navigation safety facility that is received from a flight vehicle by a flight vehicle-based navigation safety facility inspecting apparatus according to an example embodiment.

Referring to FIG. 3, a flight vehicle-based navigation safety facility inspecting apparatus may receive a navigation signal value of a navigation safety facility from a flight vehicle, and inspect the navigation safety facility by analyzing the received navigation signal value. The flight vehicle-based navigation safety facility inspecting apparatus may selectively receive, from the flight vehicle, a navigation signal value set based on a type of the navigation safety facility which is a target to be inspected.

For example, in a case in which the target to be inspected is an ILS, the flight vehicle-based navigation safety facility inspecting apparatus may inspect the ILS by analyzing an amplitude modulated (AM) depth of 90 Hz/150 Hz, a difference in depth of modulation (DDM) (sum, course, clearance), a sum of depth of modulation (SDM) (sum, course, clearance), a course deviation indicator (CDI), received power (sum, course, clearance), a frequency, and the like that are received from the flight vehicle.

For another example, in a case in which the target to be inspected is a TACAN system, flight vehicle-based navigation safety facility inspecting apparatus may inspect the TACAN system by analyzing an AM depth of 15 Hz/135 Hz, a pulse width, a squitter number, bearing, a bearing error, received power, a frequency, and the like that are received from the flight vehicle.

Figure 4:
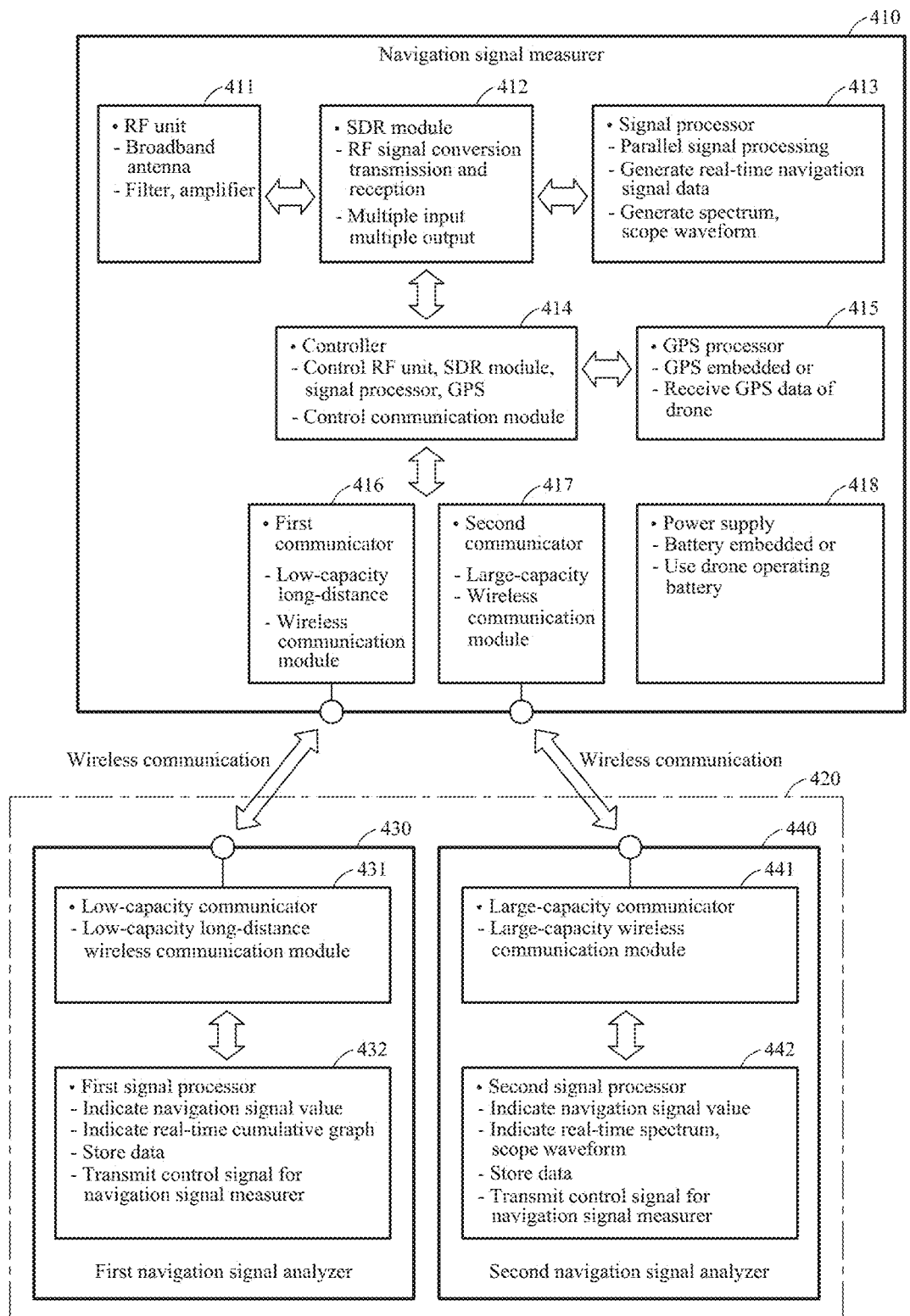
FIG. 4 is a diagram illustrating an example of a configuration of an apparatus for inspecting a navigation safety facility using a flight vehicle and a configuration of the flight vehicle according to an example embodiment.

FIG. 4 is a diagram illustrating an example of a configuration of a flight vehicle-based navigation safety facility inspecting apparatus and a configuration of a flight vehicle according to an example embodiment.

Referring to FIG. 4, a navigation signal measurer 410 provided in a flight vehicle includes a radio frequency (RF) unit 411, a software-defined radio (SDR) module 412, a signal processor 413, a controller 414, a GPS processor 415, a first communicator 416, a second communicator 417, and a power supply 418.

The navigation signal measurer 410 provided in the flight vehicle may provide a navigation signal value from a navigation safety facility and GPS data of the flight vehicle to a first navigation signal analyzer 430 through the first communicator 416, and provide the navigation signal value measured from the navigation safety facility and the GPS data of the flight vehicle to a second navigation signal analyzer 440 through the second communicator 417.

A flight vehicle-based navigation safety facility inspecting apparatus 420 includes the first navigation signal analyzer 430 and the second navigation signal analyzer 440.

The first navigation signal analyzer 430 includes a low-capacity communicator 431 which is a low-capacity long-distance wireless communication module, and a first signal processor 432. The first navigation signal analyzer 430 may receive the navigation signal value measured from the navigation safety facility and the GPS data of the flight vehicle from the navigation signal measurer 410 through the low-capacity communicator 431, and analyze the received navigation signal value and the received GPS data of the flight vehicle through the first signal processor 432. Here, the first signal processor 432 may indicate a real-time cumulative graph as a result of analyzing the navigation signal value and the GPS data of the flight vehicle.

The second navigation signal analyzer 440 includes a large-capacity communicator 441 which is a large-capacity wireless communication module, and a second signal processor 442. The second navigation signal analyzer 440 may receive the navigation signal value measured from the navigation safety facility and the GPS data of the flight vehicle from the navigation signal measurer 410 through the large-capacity communicator 441, and analyze the received navigation signal value and the received GPS data of the flight vehicle through the second signal processor 442. Here, the second signal processor 442 may indicate a real-time spectrum and scope waveform as a result of analyzing the navigation signal value and the GPS data of the flight vehicle.

Figure 5:
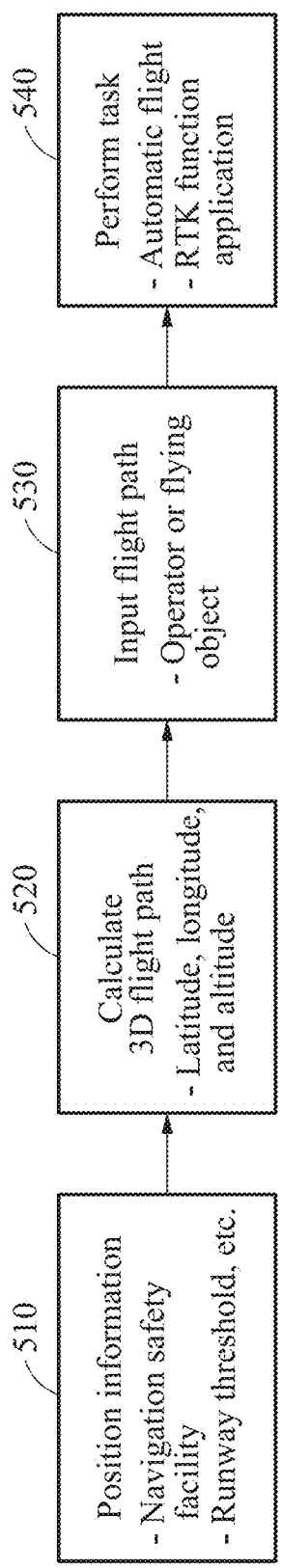
FIG. 5 is a diagram illustrating an example of controlling a flight vehicle to automatically fly by an apparatus for inspecting a navigation safety facility using the flight vehicle according to an example embodiment.

FIG. 5 is a diagram illustrating an example of controlling a flight vehicle to automatically fly by a flight vehicle-based navigation safety facility inspecting apparatus according to an example embodiment.

Referring to FIG. 5, in operation 510, a flight vehicle-based navigation safety facility inspecting apparatus verifies a central point of a navigation safety facility and a position of a runway. In operation 520, the flight vehicle-based navigation safety facility inspecting apparatus generates an inspection path including latitude, longitude, and altitude values based on the verified central point of the navigation safety facility and the verified position of the runway.

Figure 6:
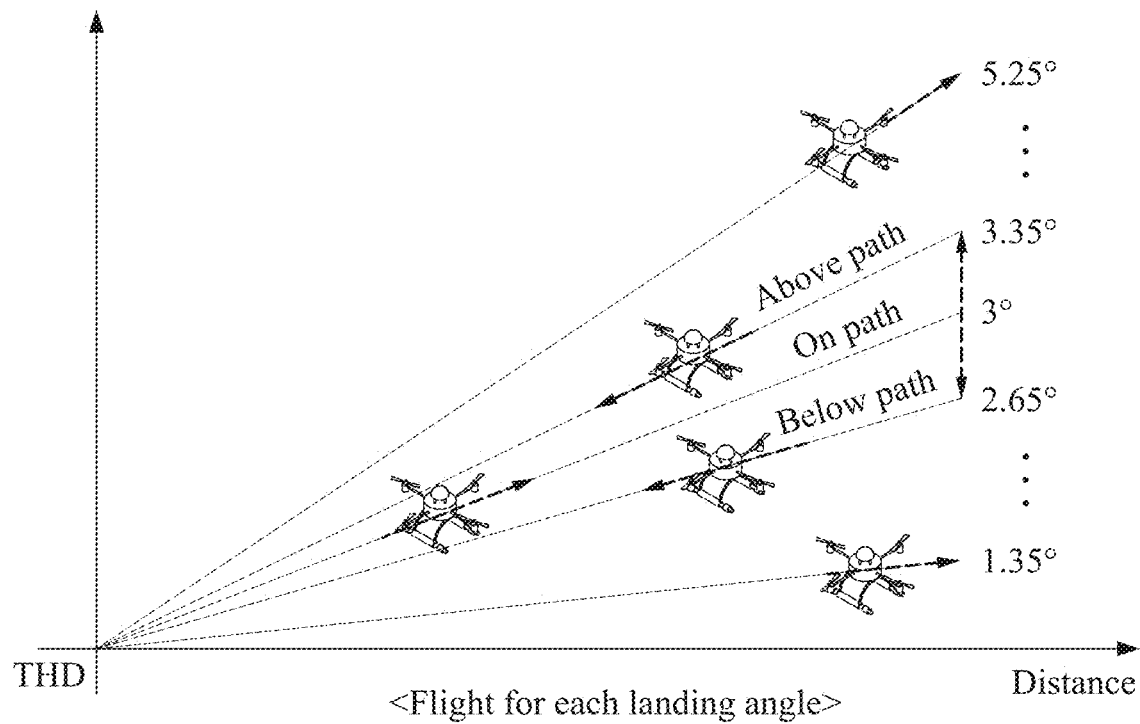
FIGS. 6 through 9 are diagrams illustrating examples of a flight path operated by an apparatus for inspecting a navigation safety facility using a flight vehicle according to an example embodiment.

Here, the flight vehicle-based navigation safety facility inspecting apparatus may generate the inspection path based on at least one of a landing angle, an altitude, a horizontal angle, or a flight distance of the flight vehicle. For example, the flight vehicle-based navigation safety facility inspecting apparatus may generate the inspection path based on various landing angles as illustrated in FIG. 6.

Figure 7:
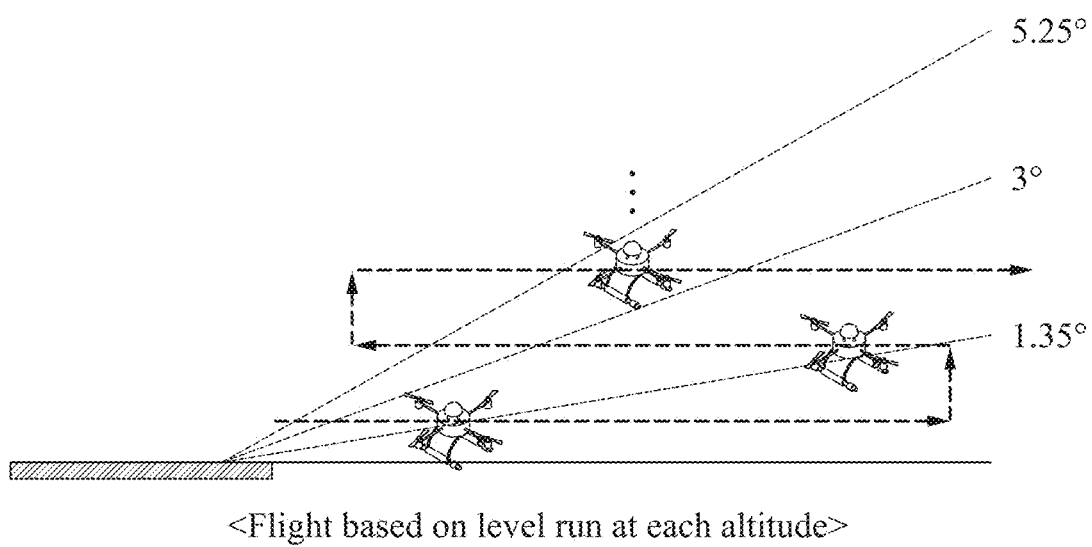
Figure 8:
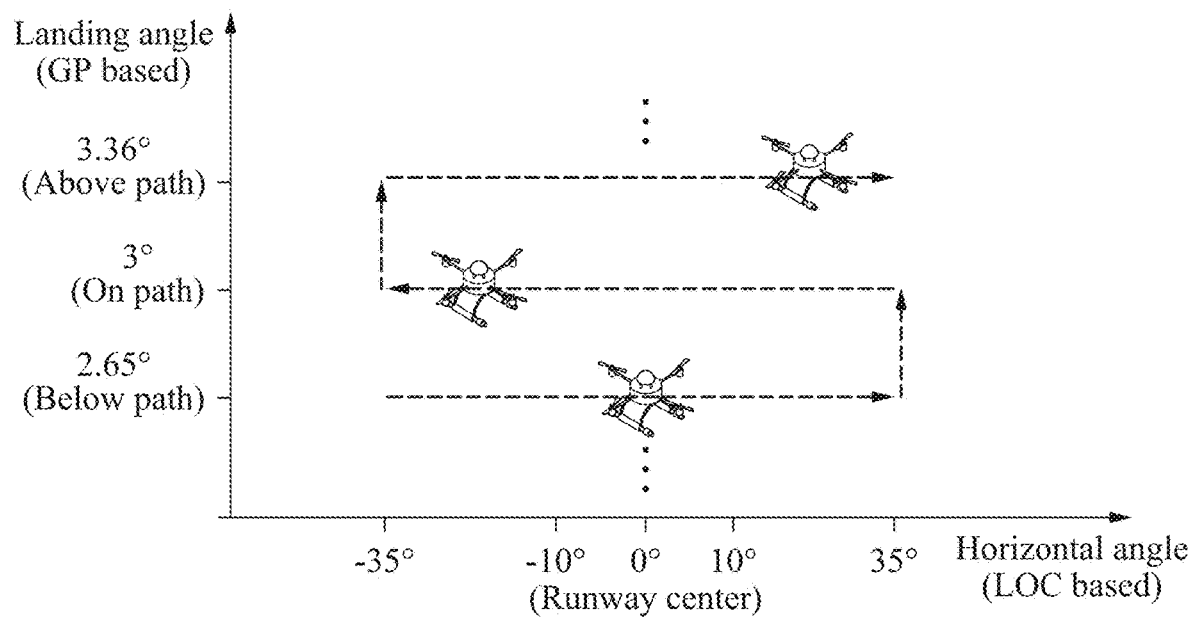

The flight vehicle-based navigation safety facility inspecting apparatus may also generate the inspection path based on a level run for each of various altitudes or heights as illustrated in FIG. 7, and generate the inspection path based on a landing angle at each of various horizontal angles as illustrated in FIG. 8.

Figure 9:
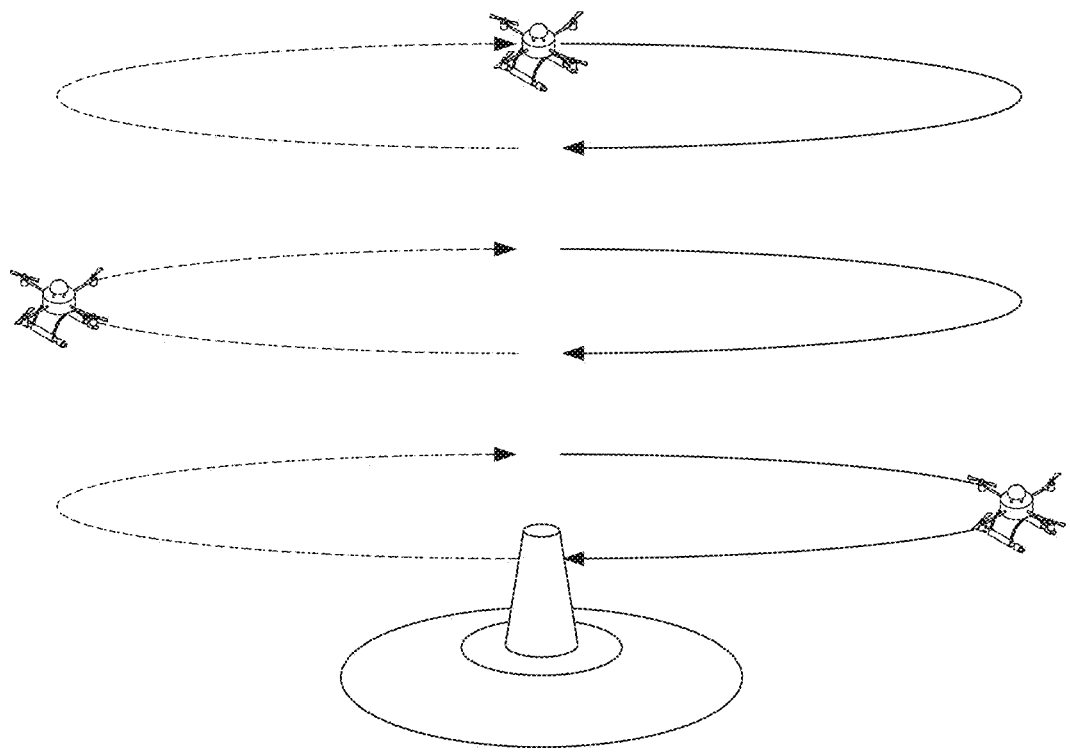

The flight vehicle-based navigation safety facility inspecting apparatus may also generate the inspection path based on a distance at each of various altitudes or heights as illustrated in FIG. 9.

In operation 530, the flight vehicle-based navigation safety facility inspecting apparatus defines the generated inspection path as a 3D flight path and provides the defined 3D flight path to the flight vehicle. In operation 540, the flight vehicle-based navigation safety facility inspecting apparatus allows the flight vehicle to automatically fly along the 3D flight path.

Figure 10:
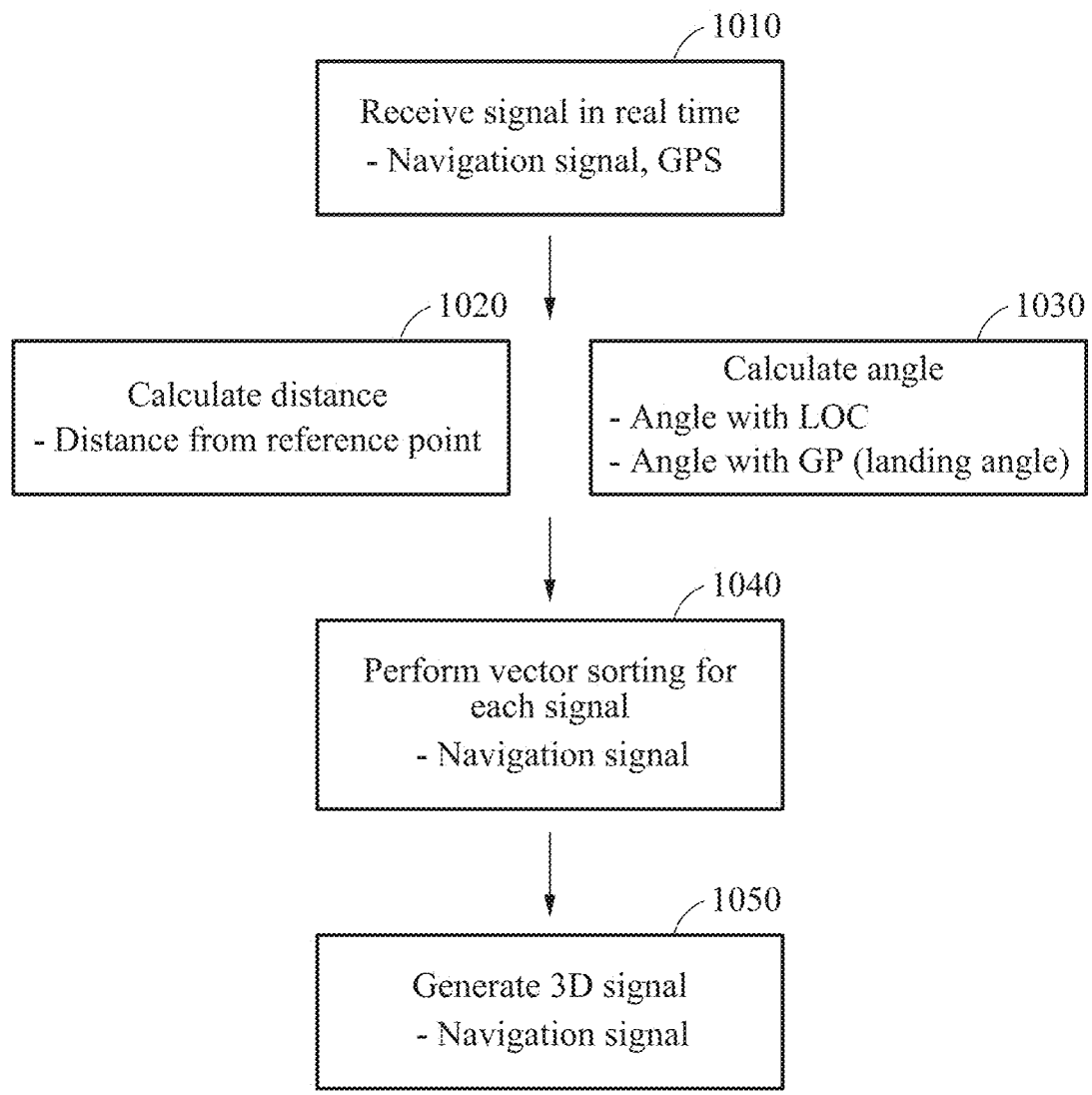
FIG. 10 is a diagram illustrating an example of analyzing a navigation signal value received from a flight vehicle by an apparatus for inspecting a navigation safety facility using the flight vehicle according to an example embodiment.

FIG. 10 is a diagram illustrating an example of analyzing a navigation signal value received from a flight vehicle by a flight vehicle-based navigation safety facility inspecting apparatus according to an example embodiment.

Referring to FIG. 10, in operation 1010, a flight vehicle-based navigation safety facility inspecting apparatus receives a navigation signal value of a navigation safety facility and GPS data of a flight vehicle from the flight vehicle automatically flying via the navigation safety facility. In operations 1020 and 1030, the flight vehicle-based navigation safety facility inspecting apparatus calculates a distance from a reference point, an angle with a LOC, and an angle with a ground point (GP) (or a landing angle). In operation 1040, the flight vehicle-based navigation safety facility inspecting apparatus performs vector sorting on the navigation signal value. In operation 1050, the flight vehicle-based navigation safety facility inspecting apparatus generates a 3D signal.

Figure 11:
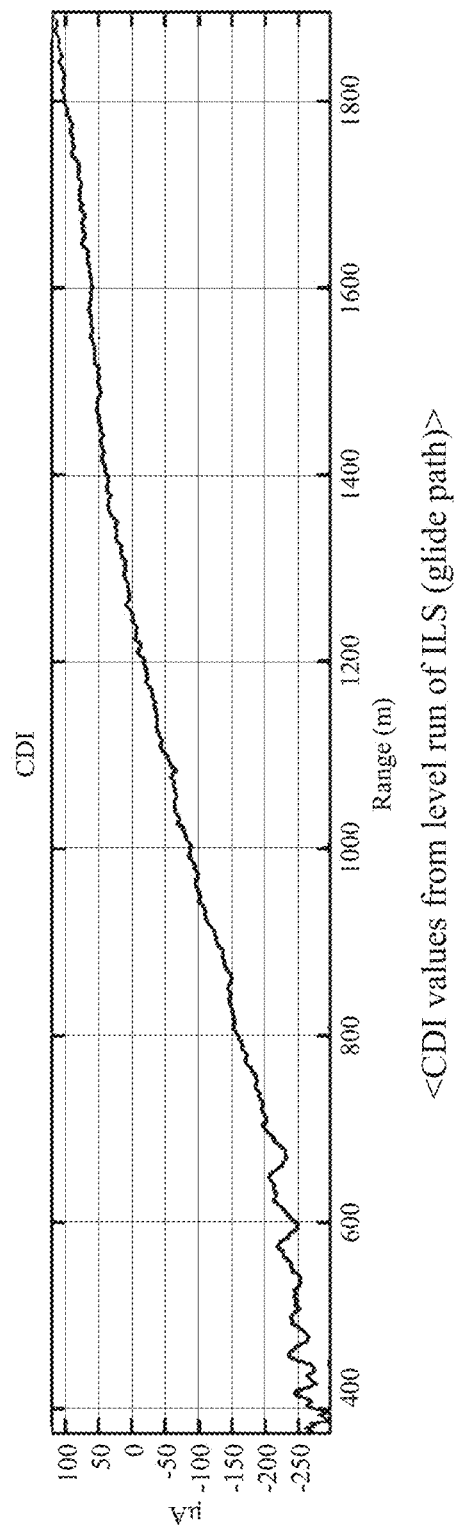
FIGS. 11 through 14 are diagrams illustrating examples of a result of analyzing a navigation signal value by an apparatus for inspecting a navigation safety facility using a flight vehicle according to an example embodiment.
Figure 12:
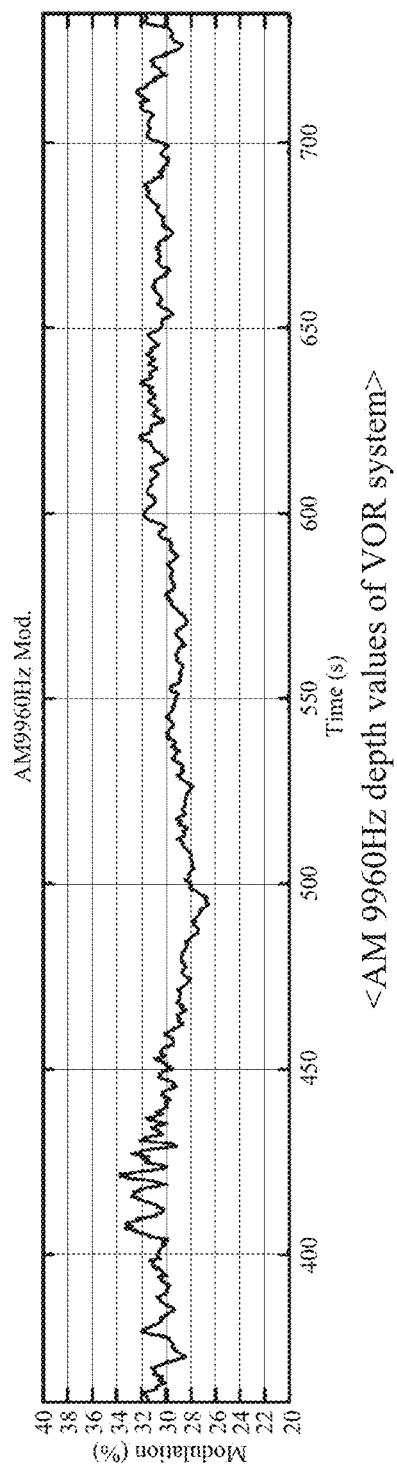

For example, the flight vehicle-based navigation safety facility inspecting apparatus may obtain and indicate, as a one-dimensional (1D) measurement result for each signal of the navigation safety facility, CDI values of a level run of an ILS (or a glide path) and AM 9960 Hz depth values of a VOR system as illustrated in FIGS. 11 and 12, respectively.

Figure 13:
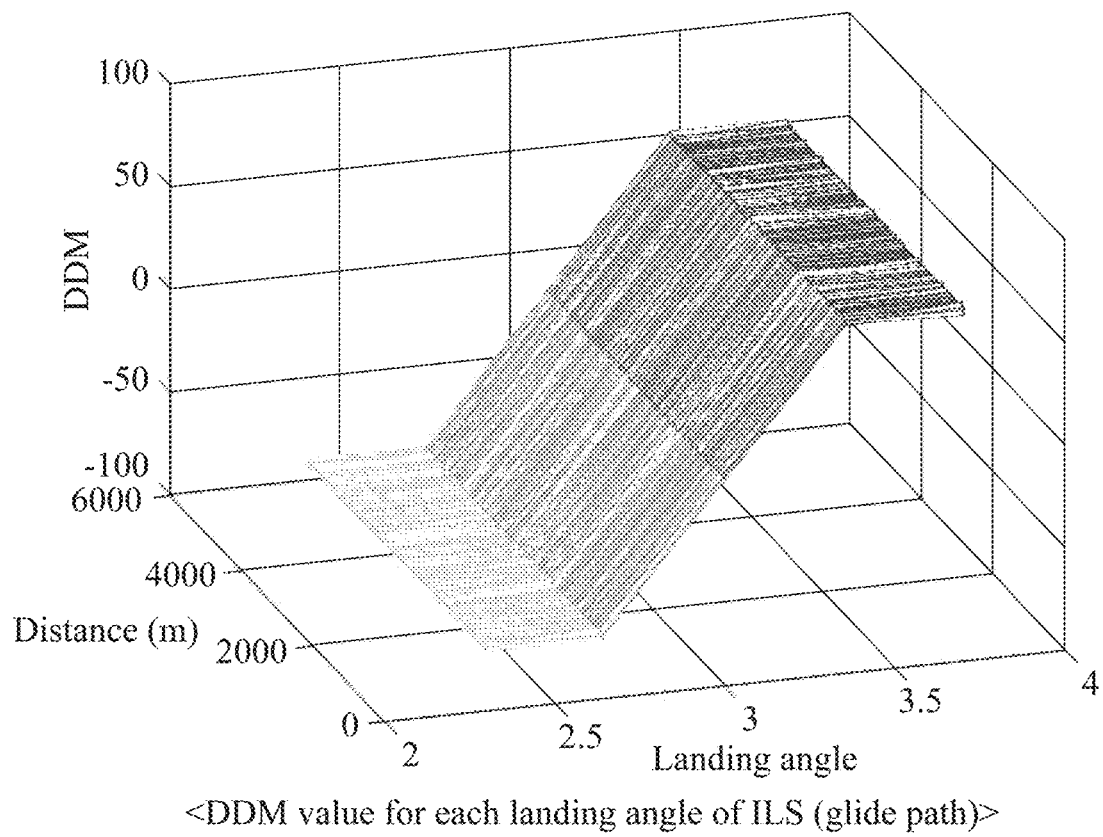
Figure 14:
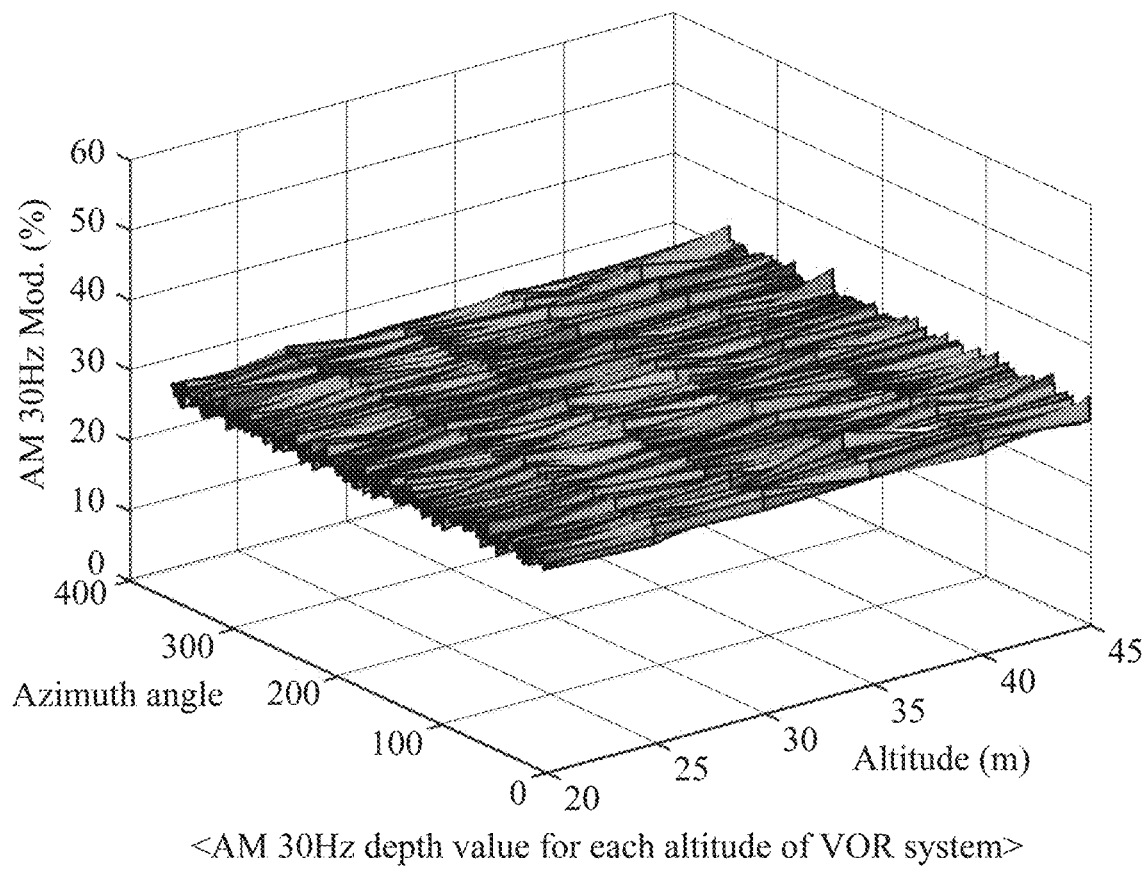

In addition, the flight vehicle-based navigation safety facility inspecting apparatus may further obtain and indicate a 3D measurement result for each signal of the navigation safety facility, in addition to the 1D measurement result for each signal of the navigation safety facility. Here, the flight vehicle-based navigation safety facility inspecting apparatus may obtain and indicate, as the 3D measurement result, a DDM value for each landing angle of an ILS (glide path) and an AM 30 Hz depth value for each altitude or height of a VOR system as illustrated in FIGS. 13 and 14, respectively.

Figure 15:
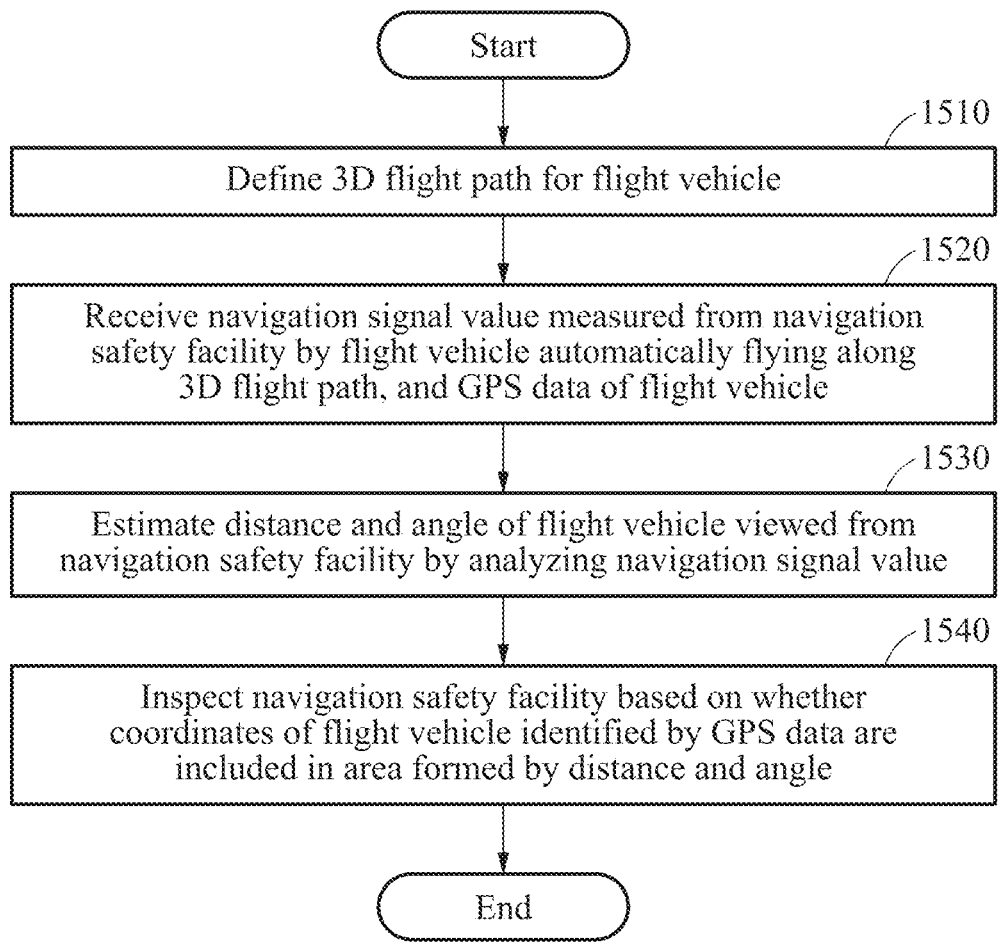
FIG. 15 is a flowchart illustrating an example of a method of inspecting a navigation safety facility using a flight vehicle according to an example embodiment.

FIG. 15 is a flowchart illustrating an example of a method of inspecting a navigation safety facility using a flight vehicle according to an example embodiment.

Referring to FIG. 15, in operation 1510, a flight vehicle-based navigation safety facility inspecting apparatus defines a 3D flight path for a flight vehicle such that it passes through a navigation safety facility. For example, the flight vehicle-based navigation safety facility inspecting apparatus may generate an inspection path including latitude, longitude, and altitude values based on a central point of the navigation safety facility and a position of a runway, define the generated inspection path as the 3D flight path, and provide the 3D flight path to the flight vehicle, to allow the flight vehicle to perform an automatic flight along the 3D flight path.

When generating the inspection path, the flight vehicle-based navigation safety facility inspecting apparatus may generate the inspection path based on at least one of a landing angle, an altitude, a horizontal angle, or a flight distance of the flight vehicle.

The navigation safety facility may include at least one device among an ILS, a radar system, a VOR system, a TACAN system, a DME, and an aeronautical control communication system (e.g., an air/ground (AG) communication system).

A navigation signal measurer provided in the flight vehicle may measure navigation signal values of different types for each device included in the navigation safety facility.

In operation 1520, the flight vehicle-based navigation safety facility inspecting apparatus receives a navigation signal value of the navigation safety facility measured by the flight vehicle automatically flying along the defined 3D flight path and GPS data of the flight vehicle. For example, the flight vehicle-based navigation safety facility inspecting apparatus may verify a type of the navigation safety facility which is a target to be inspected, and selectively receive a navigation signal value that is set based on the verified type of the navigation safety facility.

In operation 1530, the flight vehicle-based navigation safety facility inspecting apparatus analyzes the navigation signal value, and estimates a distance and angle of the flight vehicle that is viewed from the navigation safety facility.

In operation 1540, the flight vehicle-based navigation safety facility inspecting apparatus inspects the navigation safety facility based on whether coordinates of the flight vehicle identified by the GPS data are included in an area formed by the distance and angle.

For example, the flight vehicle-based navigation safety facility inspecting apparatus may calculate a standard distance and a standard angle between the flight vehicle and the navigation safety facility based on the GPS data and position data of the navigation safety facility, and inspect the navigation safety facility based on whether the estimated distance and angle are within the calculated standard distance and angle and a set allowable range. In this example, when at least one of the distance or the angle is out of the standard distance or the standard angle, and the allowable range, the flight vehicle-based navigation safety facility inspecting apparatus may determine the navigation safety facility to be abnormal and output a message associated with such an abnormality. In contrast, when at least one of the distance or the angle is not out of the standard distance or the standard angle, and the allowable range, the flight vehicle-based navigation safety facility inspecting apparatus may determine the navigation safety facility to be abnormal.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

The invention claimed is:

1. A method of inspecting a navigation safety facility using a flight vehicle, performed by an apparatus including a controller, an interface, an estimator, and a processor, the method comprising:
defining, by the controller, a three-dimensional (3D) flight path for the flight vehicle such that it passes through the navigation safety facility;
receiving, by the interface, a navigation signal value of the navigation safety facility measured by the flight vehicle automatically flying along the defined 3D flight path, and global positioning system (GPS) data of the flight vehicle;
estimating, by the estimator, a distance and an angle of the flight vehicle viewed from the navigation safety facility by analyzing the navigation signal value; and
inspecting, by the processor, the navigation safety facility based on whether coordinates of the flight vehicle identified by the GPS data are included in an area formed by the distance and the angle,
wherein the receiving comprises:
verifying, by the interface, a type of the navigation safety facility which is a target to be inspected; and
selectively receiving, by the interface, a navigation signal value set based on the verified type of the navigation safety facility among navigation signal values measured by the flight vehicle.

2. The method of claim 1, further comprising:
calculating, by the processor, a standard distance and a standard angle between the flight vehicle and the navigation safety facility, based on the GPS data and position data of the navigation safety facility; and
inspecting, by the processor, the navigation safety facility based on whether the estimated distance and angle are within the calculated standard distance and angle, and a set allowable range.

3. The method of claim 2, wherein the inspecting of the navigation safety facility comprises:
in response to at least one of the distance or the angle being out of the standard distance or the standard angle, and the allowable range, determining, by the processor, the navigation safety facility to be abnormal and outputting a message on abnormality.

4. The method of claim 1, wherein the defining of the 3D flight path further comprises:
generating, by the controller, an inspection path including latitude, longitude, and altitude values based on a central point of the navigation safety facility and a position of a runway; and
defining, by the controller, the generated inspection path as the 3D flight path and providing the flight vehicle with the 3D flight path to allow the flight vehicle to automatically fly along the 3D flight path.

5. The method of claim 4, wherein the generating of the inspection path comprises:
generating, by the controller, the inspection path based on at least one of a landing angle, an altitude, a horizontal angle, or a flight distance of the flight vehicle.

6. The method of claim 1, wherein the navigation safety facility comprises at least one device among an instrument landing system (ILS), a radio detection and ranging (radar) system, a very-high-frequency omni-directional range (VOR) system, a tactical air navigation (TACAN) system, a distance measuring equipment (DME), and an air/ground (A/G) control communication system,
wherein a navigation signal measurer provided in the flight vehicle is configured to measure a navigation signal value of a different type for each device.

7. An apparatus for inspecting a navigation safety facility using a flight vehicle, comprising:
a controller configured to define a three-dimensional (3D) flight path for the flight vehicle such that it passes through the navigation safety facility;
an interface configured to receive a navigation signal value of the navigation safety facility measured by the flight vehicle automatically flying along the defined 3D flight path, and global positioning system (GPS) data of the flight vehicle;
an estimator configured to estimate a distance and an angle of the flight vehicle viewed from the navigation safety facility by analyzing the navigation signal value; and
a processor configured to inspect the navigation safety facility based on whether coordinates of the flight vehicle identified by the GPS data are included in an area formed by the distance and the angle, wherein the interface is configured to:

verify a type of the navigation safety facility which is a target to be inspected, and selectively receive a navigation signal value set based on the verified type of the navigation safety facility among navigation signal values measured by the flight vehicle.

8. The apparatus of claim 7, wherein the processor is configured to:

calculate a standard distance and a standard angle between the flight vehicle and the navigation safety facility based on the GPS data and position data of the navigation safety facility, and inspect the navigation safety facility based on whether the estimated distance and angle are within the calculated standard distance and angle, and a set allowable range.

9. The apparatus of claim 8, wherein the processor is configured to:

in response to at least one of the distance or the angle being out of the standard distance or angle, and the allowable range, determine the navigation safety facility to be abnormal and output a message on abnormality.

10. The apparatus of claim 7, wherein the controller is configured to:

generate an inspection path including latitude, longitude, and altitude values based on a central point of the navigation safety facility and a position of a runway, and define the generated inspection path as the 3D flight path and provide the flight vehicle with the defined 3D flight path, to allow the flight vehicle to automatically fly along the 3D flight path.

11. The apparatus of claim 10, wherein the controller is configured to:

generate the inspection path based on at least one of a landing angle, an altitude, a horizontal angle, or a flight distance of the flight vehicle.

12. The apparatus of claim 7, wherein the navigation safety facility comprises at least one device among an instrument landing system (ILS), a radio detection and ranging (radar) system, a very-high-frequency omni-directional range (VOR) system, a tactical air navigation (TACAN) system, a distance measuring equipment (DME), and an air/ground (A/G) control communication system, wherein a navigation signal measurer provided in the flight vehicle is configured to measure a navigation signal value of a different type for each device.

* * * * *